Dec. 12, 1961 E. H. GEIBEL 3,012,830
LAUNDRY MACHINE
Filed Dec. 18, 1959
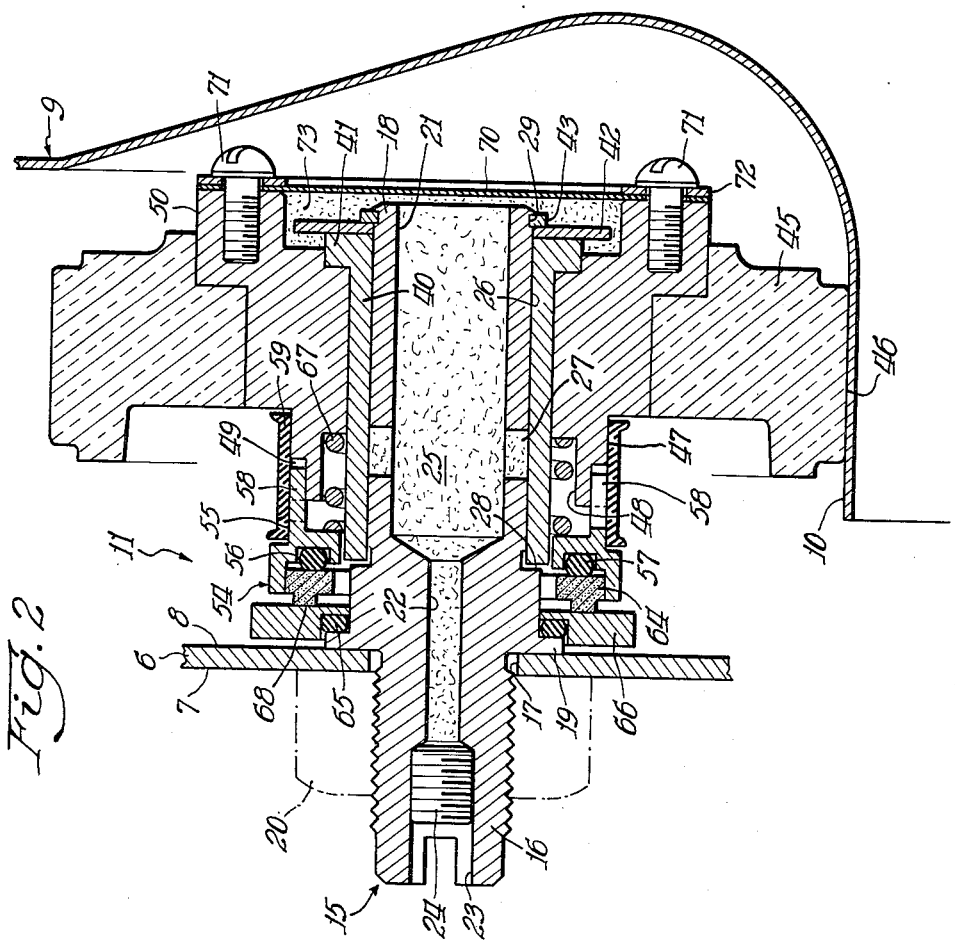
Inventor:
Emmett H. Geibel
By: H. J. Schmid
Atty.

United States Patent Office 3,012,830
Patented Dec. 12, 1961

3,012,830
LAUNDRY MACHINE
Emmett H. Geibel, Effingham, Ill., assignor to Borg-Warner Corporation, Chicago, Ill., a corporation of Illinois
Filed Dec. 18, 1959, Ser. No. 860,586
9 Claims. (Cl. 308—203)

This invention relates to a roller bearing assembly for a laundry machine and more particularly to a bearing assembly having a sealed lubrication system.

The instant invention is concerned with a bearing assembly for rotatably supporting the clothes basket or cylinder of a laundry machine, similar to the machine completely disclosed in the co-pending patent application of Robert D. Shapter, S.N. 655,575, filed April 29, 1957 and entitled "Clothes Dryer."

In certain clothes washing and/or drying machines, a rotating basket or cylinder, is provided for retaining the clothes during the laundry operations. The cylinder may be supported by roller bearing assemblies appropriately positioned around the periphery thereof. These bearing assemblies are subjected to extended wear and, in most cases, are subjected to the hot water and air of the machine during the washing and/or drying processes. The extended wear on the assemblies creates a maintenance and repair problem and requires a complete lubricating system. The hot water and air used during the washing and drying, have a tendency to wash the lubricant from the bearing assemblies or otherwise remove the lubricant from the assemblies by heating the lubricant, causing it to expand and flow out of the bearing assembly. It is therefore extremely important to be able to provide lubricated bearings for such laundry machines which are amenable to ordinary maintenance, but moreover, are protected from the washing effect of the hot water and from the lubrication expanding effect of the hot water and air, so that the bearing assembly lubricant can be maintained in the bearing.

It is the primary object of this invention to provide a bearing assembly of simple and economical construction for rotatably supporting the clothes basket of a laundry machine.

Another object of this invention is to provide a bearing assembly having an expansibly sealed lubricating system.

A further object of this invention is to provide a roller bearing assembly having a running seal which positively seals lubricant within the roller bearing assembly.

Still another object of this invention is to provide a roller bearing assembly having a sealed lubrication system which is readily amenable to repair and maintenance.

With these and other objects in view, the present invention contemplates a bearing assembly having an axle rigidly mounted on the frame of a washing machine wherein the axle is longitudinally and laterally bored to provide a lubrication retaining cavity in communication with the axle bearing surface and opening outwardly from the end of the axle. A bearing is supported on the bearing surface of the axle and held against longitudinal movement on the axle. A spring-biased running seal means, concentrically mounted on the axle, is urged into sealing engagement with a stationary seal between the axle and the frame. This running seal means is splined to the roller bearing, and a flexible seal is provided over the spline to prevent lubricant from passing therethrough. A flexible diaphragm is mounted on the outer side of the roller bearing and spans the open end lubricant cavity of the axle, and the bearing surface of said axle, to retain the lubricant expansibly within the roller bearing assembly.

Other objects, advantages and novel aspects of the invention will become apparent on further knowledge of the description in conjunction with the accompanying drawings wherein:

FIG. 1 is a side view of a laundry machine showing the position of the novel bearing assembly relative to the rotatable clothes retaining basket of the laundry machine.

FIG. 2 is a sectional view through the roller bearing assembly showing the relative position of the elements thereof.

Referring to FIG. 1 there is illustrated a clothes washing and/or drying machine, generally designated by the numeral 5, which is provided with a frame 6 having inner and outer surfaces 7 and 8 respectively. A cylindrical clothes basket 9 is provided within the machine 5 adjacent the frame 6 and has two peripheral track surfaces 10. A bearing assembly, generally designated by the numeral 11 in FIGS. 1 and 2, is provided at various positions on the frame 6 in rolling engagement with the track 10 of the clothes basket 9 to rotatably support the clothes basket 9 on the frame 6.

The roller bearing assembly 11 is shown in detail in FIG. 2 and comprises, among other things, an axle generally designated by the numeral 15, having a threaded inner end portion 16 inserted through an opening 17 in the frame 6, and an outer portion 18 extending from the outer surface 8 of frame 6. The axle 15 is provided with an annular flange 19 which is drawn against the outside surface 8 of the frame 6 by means of a nut 20 tightened on the threaded inner end portion 16 of the axle 15, on the inside surface 7 of the frame 6.

The axle 15 is provided with three interconnecting longitudinal bores, namely a large outer end bore 21, an intermediate bore 22, and a small inner threaded bore 23. A grease fitting 24 is threaded into the bore 23 to facilitate filling of the outer bore 21 with lubricating grease 25. The outer end portion 18 of the axle 15 is provided with a cylindrical bearing surface 26 and radial bores 27 interconnecting the bearing surface 26 and the longitudinal bore 21 to allow the lubricating grease 25 to flow to the bearing surface 26 from the bore 21. A shoulder 28 and an annular snap-ring slot 29 are provided on the axle 15.

A bearing 40 is concentrically rotatably mounted on the bearing surface 26 of the axle adjacent the shoulder 28 of the axle. The bearing 40 is provided with an annular flange 41 on the outer surface thereof adjacent the end of the outer end portion 18 of the axle. The bearing 40 is held against longitudinal movement on the axle by the shoulder 28 thereon and by a thrust washer 42 retained on the bearing surface 26 of the axle by a snap-ring 43 seated in the snap-ring slot 29.

A roller 45 is concentrically mounted on the bearing 40 to rotate with the bearing. The roller 45 is held against outward longitudinal movement on the axle by the annular flange 41 of the bearing 40. The roller is provided with a peripheral support surface 46 in engagement with the circular track surface 10 of the clothes basket of the washing machine. A cylindrical surface 47 is provided on the roller 45 and extends longitudinally from the inner side thereof. Also, the roller is provided with an annular groove 48 on the inner side thereof, adjacent the bearing 40. A series of annularly spaced longitudinal slots 49 are formed in the roller surface 47. An annular portion 50 is provided on the outer side of the roller and projects longitudinally therefrom beyond the outer end of the bearing surface 18 of the axle.

A rotatably annular seal retainer 54 is concentrically mounted around the bearing 40 and is provided with an outer cylindrical surface 55 and an annular longitudinally extending slot 56 which retains an annular seal 57.

A series of projections 58 are positioned radially on the outer side of the seal retainer 54, which project longitudinally along the axle and fit slidably into respective slots 49 of the roller 45 to provide a spline connection between the roller 45 and the retainer 54. This spline structure causes the retainer 54 and roller 45 to rotate together and allows longitudinal movement between the retainer and the roller. A flexible seal band 59, made of rubber or other similar resilient flexible material, is mounted on the cylindrical surfaces 55 and 47 of the seal retainer and the roller respectively to prevent passage of the lubricant 25 through the spline connection therebetween.

A running seal 64, made of carbon or other similar hard low friction material, is concentrically secured within the seal retainer 54 to rotate with the retainer. A stationary seal 65 and stationary retainer 66 therefor, are provided to seal the opening 17 between the axle 15 and the frame 6.

A coil spring 67 is concentrically mounted on the bearing 40 in the annular groove 48 in the roller 45. The spring 67 urges the roller 45 and bearing 40 outwardly on the axle to cause bearing 40 to engage the thrust washer 42, and urges the seal retainer 54 and the carbon seal 64, into engagement with the stationary seal retainer 66 at 68 to seal the seal retainer 54 with the frame 6.

A diaphragm 70 made of rubber, or other similar flexible resilient material, is mounted on the annular projection 50 provided on the outer side of the roller 45, by means of screws 71 and an annular clamping ring 72. The open end of the axle 15 and the bearing surface 26 between the axle 15 and the bearing 40, are thereby enclosed in an expansible lubricant cavity 73 by virtue of the expandable diaphragm 70.

In operation, the lubricating grease 25 is forced into the bores 21 and 22 of the axle 15 through the grease fitting 24 and into the expandable cavity 73. As the basket is rotated on the roller during washing and drying cycles of the washing machine 7, the bearings 40 will move on the bearing surface 26 of the axle 15, and the grease 25 will flow onto the bearing surfaces of the bearing assembly 11, and eventually the grease 25 will flow out into the areas adjacent the bearing surfaces.

In the event that hot water flows over any portion of the bearing assembly 11 during the washing operation, the seals 65, 64, 57 and 59 and the diaphragm 70 will prevent the water from contacting the lubricant 25 or entering the bearing surface 26 of the bearing assembly 11. Thus, the bearing surface 26 will be protected from the washing effect of the hot water which would otherwise remove the grease from the bearing surfaces. Also, it will be noted that the diaphragm 70 is resilient and expandable so that when the lubricant 25 is exanded by the flow of hot water or air striking the roller bearing assembly 11 during the washing or drying operations, the grease will not be forced out of the roller bearing apparatus by its own expansion, but instead will merely expand into the sealed cavity 73 and be expansibly retained by the resilient diaphragm 70.

While I have described my invention in connection with one specific embodiment thereof, it is to be understood that this is by way of illustration and not by way of limitation as it is contemplated that the invention can be applied to either a washer or dryer, or a machine utilizing a bearing construction of the type described. Accordingly, the scope of my invention is defined solely by the appended claims which should be construed as broadly as the prior art will permit.

I claim:

1. A roller bearing assembly adapted to rotatably support a clothes basket on the frame of a laundry machine comprising an axle rigidly mounted on the frame, said axle having a cavity in an outer end thereof communicating with the surface of said axle, a roller concentrically rotatably mounted on said axle, a running seal means concentrically rotatably mounted around said axle, said running seal means being splined to said roller, a spline seal means enclosing said running seal means, means for longitudinally urging said running seal means to maintain said running seal means in engagement with the frame, a flexible diaphragm mounted on the outer side of said roller for enclosing the outer side of said roller, and a lubricant in the axle cavity and adjacent said diaphragm.

2. A roller bearing assembly adapted to rotatably support a clothes basket on the frame of a laundry machine comprising an axle rigidly mounted on the frame, said axle having a cylindrical bearing surface extending outwardly from the frame, said axle having a cavity in the outer end thereof communicating with the bearing surface of said axle, a stationary lubricant seal between the frame and the axle, a roller concentrically rotatably mounted on the bearing surface of said axle, a running seal means concentrically rotatably mounted around said axle, said running seal means being splined to said roller, a spline seal enclosing said running seal means, means for longitudinally urging said running seal means to maintain said running seal in engagement with said stationary seal, a flexible diaphragm mounted on the outer side of said roller for enclosing the outer side of said roller, and a lubricant in the axle cavity and adjacent said diaphragm.

3. A roller bearing assembly adapted to rotatably support a clothes basket on the frame of a laundry machine comprising an axle rigidly mounted on the frame, said axle having a cylindrical bearing surface at one end extending from the frame, said axle having radial and longitudinal inter-communicating bores therethrough in the extending bearing-surface end of said axle, a stationary lubricant seal between the frame and the axle, a roller concentrically rotatably mounted on the bearing surface of said axle, a running seal concentrically rotatably mounted around said axle, said running seal being splined to said roller, a spline seal enclosing the spline connection, means for longitudinally urging said running seal to maintain said running seal in engagement with said stationary seal, a flexible diaphragm mounted on the outer side of said roller for enclosing the outer side of said roller, and a lubricant in the bores of said axle and adjacent said diaphragm.

4. A roller bearing assembly adapted to rotatably support a clothes basket on the frame of a laundry machine comprising an axle rigidly mounted on the frame and having a cylindrical bearing surface extending outwardly from the frame, said axle having an axial cavity in the outer end thereof and radial bores therethrough communicating with the bearing surface and the axial cavity of said axle, a stationary lubricant seal between the frame and the axle, a cylindrical bearing concentrically rotatably mounted on the bearing surface of said axle enclosing the radial bores in said axle, a roller concentrically secured to said bearing to rotate with said bearing, said roller having a cylindrical surface concentric with said bearing and extending inwardly toward the frame, said surface having annularly spaced longitudinal slots therein, a running seal means concentrically rotatably mounted around said axle, said running seal means being splined to said roller, a spline seal for enclosing said running seal means and said roller cylindrical surface, means for longitudinally urging said running seal to maintain said running seal in engagement with said stationary seal, a flexible diaphragm mounted on the outer side of said roller for enclosing the outer side of said roller, and a lubricant in the axle cavity and adjacent said diaphragm.

5. A roller bearing assembly adapted to rotatably support a clothes basket on the frame of a laundry machine comprising an axle rigidly mounted on the frame, said axle having a cylindrical bearing surface extending outwardly from the frame, said axle having a cavity in the outer end thereof communicating with the bearing surface of said axle, a stationary lubricant seal between the frame and the axle, a roller concentrically rotatably mounted on the bearing surface of said axle, said roller having an annular groove adjacent said bearing, a cylindrical surface extending longitudinally inward on said roller concentric with said bearing, said surface having annularly spaced longitudinal slots therein adjacent said axle, means on said axle to prevent outward longitudinal movement of said roller, a running seal retainer concentrically rotatably positioned around said axle and having an annular slot opening longitudinally inward, said running seal retainer having longitudinal annularly spaced projections slidably supported concentrically about said axle on said roller in the annularly spaced longitudinal slots in said roller, an annular running seal secured within said seal retainer, an annular seal positioned in the slot of said retainer and projecting outwardly therefrom in engagement with said running seal, means for longitudinally urging said running seal retainer to maintain said running seal in engagement with said stationary seal, a flexible band seal mounted on said roller and said seal retainer for sealing the connection therebetween, a flexible diaphragm mounted on the outer side of said roller for enclosing the outer side of said roller, and a lubricant in the axle cavity and adjacent said diaphragm.

6. A roller bearing assembly adapted to rotatably support a clothes basket on the frame of a laundry machine comprising an axle rigidly mounted on the frame having a cylindrical bearing surface at one end extending from the frame, said axle having radial and longitudinal intercommunicating bores therethrough in the bearing-surface end of said axle, a stationary lubricant seal between the frame and said axle, a cylindrical bearing concentrically rotatably mounted on the bearing surface of said axle enclosing the radial bores in said axle, said bearing having an annular flange on the outer end thereof, a roller concentrically secured to said bearing to rotate with said bearing, said roller having a cylindrical surface concentric with said bearing extending inwardly toward the frame, said surface having annularly spaced longitudinal slots therein adjacent said axle, a running seal means concentrically rotatably mounted around said axle, said running seal means being splined to said roller in said annularly spaced longitudinal slots therein, means for longitudinally urging said running seal means to maintain said running seal in engagement with said stationary seal, a flexible diaphragm mounted on the outer side of said roller for enclosing the outer side of said roller, and a lubricant in the axle bores and adjacent said diaphragm.

7. A roller bearing assembly adapted to rotatably support a clothes basket on the frame of a laundry machine comprising an axle rigidly mounted on the frame having a cylindrical bearing surface at one end extending from the frame, a one-way lubricant valve mounted in the axle within the frame, said axle having radial and longitudinal intercommunicating bores therethrough in the bearing-surface end of said axle communicating with said lubricant receiving valve, a stationary lubricant seal between the frame and said axle, a cylindrical bearing concentrically rotatably mounted on the bearing surface of said axle enclosing the radial bores in said axle, said bearing having an annular flange on the outer end thereof, a roller concentrically secured to said bearing to rotate with said bearing, a cylindrical surface extending longitudinally toward the frame concentric with said bearing, said surface having annularly spaced longitudinal slots therein adjacent said axle, a running seal means concentrically rotatably positioned around said axle adjacent the frame, said running seal means being splined to said roller in said annularly spaced longitudinal slots in said roller, means for longitudinally urging said running seal to maintain said running seal in engagement with said stationary seal, a flexible diaphragm mounted on the outer side of said roller for enclosing the outer side of said roller, and a lubricant in the bores of said axle adjacent said diaphragm for lubricating the bearing assembly.

8. A roller bearing assembly adapted to rotatably support a clothes basket on the frame of a laundry machine comprising an axle rigidly mounted on the frame, a lubricant fitting mounted in the axle within the frame, said axle having radial and longitudinal intercommunicating bores therethrough in the bearing-surface end of said axle communicating with said lubricant receiving valve for receiving lubricant applied to said fitting, a stationary lubricant seal between the frame and the axle, a cylindrical bearing concentrically rotatably mounted on the bearing surface of said axle enclosing the radial bores in said axle, a roller concentrically secured to said bearing to rotate with said bearing, a cylindrical surface extending longitudinally on said roller toward the frame and concentric with said bearing having annularly spaced longitudinal slots therein adjacent said axle, a running seal concentrically rotatably positioned around said axle adjacent the frame, said running seal having longitudinal annularly spaced projections slidably supported concentrically about said axle on the roller in the annular spaced longitudinal slots in said roller, means for longitudinally urging said running seal to maintain said running seal in engagement with said stationary seal, a flexible diaphragm mounted on the outer side of said roller for enclosing the outer side of said roller, and a lubricant in the bores of said axle adjacent said diaphragm to lubricate the bearing assembly.

9. A roller bearing assembly adapted to rotatably support a clothes basket on the frame of a laundry machine comprising an axle rigidly mounted on the frame having a cylindrical bearing surface at one end extending from the frame, a lubricant fitting mounted in the axle within the frame, said axle having radial and longitudinal intercommunicating bores therethrough in the extending end of said axle communicating with said fitting for receiving lubricant forced through said valve, a stationary lubricant seal between the frame and the axle, a cylindrical bearing concentrically rotatably mounted on the bearing surface of said axle enclosing the radial bores in said axle, a roller concentrically secured to said bearing to rotate with said bearing, said roller having an annular groove adjacent said bearing, a cylindrical surface extending longitudinally toward said frame concentric with said bearing having annularly spaced longitudinal slots therein, means on said axle to prevent outward longitudinal movement of said roller, a running seal retainer concentrically rotatably positioned around said axle having an annular slot opening longitudinally inward, an annular seal positioned in the slot of said retainer and projecting outwardly therefrom, an annular running seal secured within said seal retainer, said running seal retainer having longitudinal annularly spaced projections slidably supported concentrically about said axle on the roller in the annularly spaced longitudinal slots in said roller, a coil spring concentrically mounted in the groove of said roller adjacent the bearing for urging said seal retainer toward said stationary seal to cause said stationary seal and said running seal to seat, a flexible diaphragm mounted on the outer side of said roller for enclosing the outer side of said roller, and a lubricant applied to said valve for providing lubricant in the bores of said axle adjacent said diaphragm to lubricate the bearing assembly.

References Cited in the file of this patent

UNITED STATES PATENTS

| | | |
|---|---|---|
| 2,278,363 | Broshkevitch | Mar. 31, 1942 |
| 2,641,515 | Bankauf et al. | June 9, 1953 |
| 2,892,642 | Payne | June 30, 1959 |